United States Patent [19]

Massie

[11] 4,340,304

[45] Jul. 20, 1982

[54] INTERFEROMETRIC METHOD AND SYSTEM

[75] Inventor: Norbert A. Massie, Thousand Oaks, Calif.

[73] Assignee: Rockwell International Corporation, El Segundo, Calif.

[21] Appl. No.: 933,011

[22] Filed: Aug. 11, 1978

[51] Int. Cl.³ .............................................. G01B 9/02
[52] U.S. Cl. ................................... 356/351; 356/349
[58] Field of Search ............... 356/349, 351, 359, 371; 350/358

[56] References Cited

U.S. PATENT DOCUMENTS

| | | | |
|---|---|---|---|
| 3,345,909 | 10/1967 | De Maria | 350/358 |
| 3,620,593 | 11/1971 | Tackaberry | 356/351 |
| 3,656,853 | 4/1972 | Bagley | 356/349 |
| 3,694,088 | 9/1972 | Gallagher | 356/351 |
| 3,767,307 | 10/1973 | Bowker | 356/349 |
| 3,836,256 | 9/1974 | Peters | 356/349 |
| 3,849,003 | 11/1974 | Velzel | 356/359 |
| 4,030,831 | 6/1977 | Gowrinathan | 356/349 |
| 4,188,122 | 2/1980 | Massie et al. | 356/349 |

*Primary Examiner*—William H. Punter
*Attorney, Agent, or Firm*—H. Fredrick Hamann; Harry B. Field

[57] ABSTRACT

An interferometer for detecting defects in the surface of a mirror or inhomogeneities in a medium uses two coherent but orthogonally polarized beams, one of which may be frequency or phase modulated. The two beams are separately directed into a test arm and a reference arm and, upon their return, recombined, and polarization filtered so that they interfere. The interference pattern is detected in a plane in plural, individual detection points. The resulting electrical signals are processed to obtain OPD information at a resolution that is much higher than the wavelength of the beams used. An alternative method using neither phase modulation nor frequency modulation is based on additional, separate point by point detection of the intensities of the individual beams.

4 Claims, 13 Drawing Figures

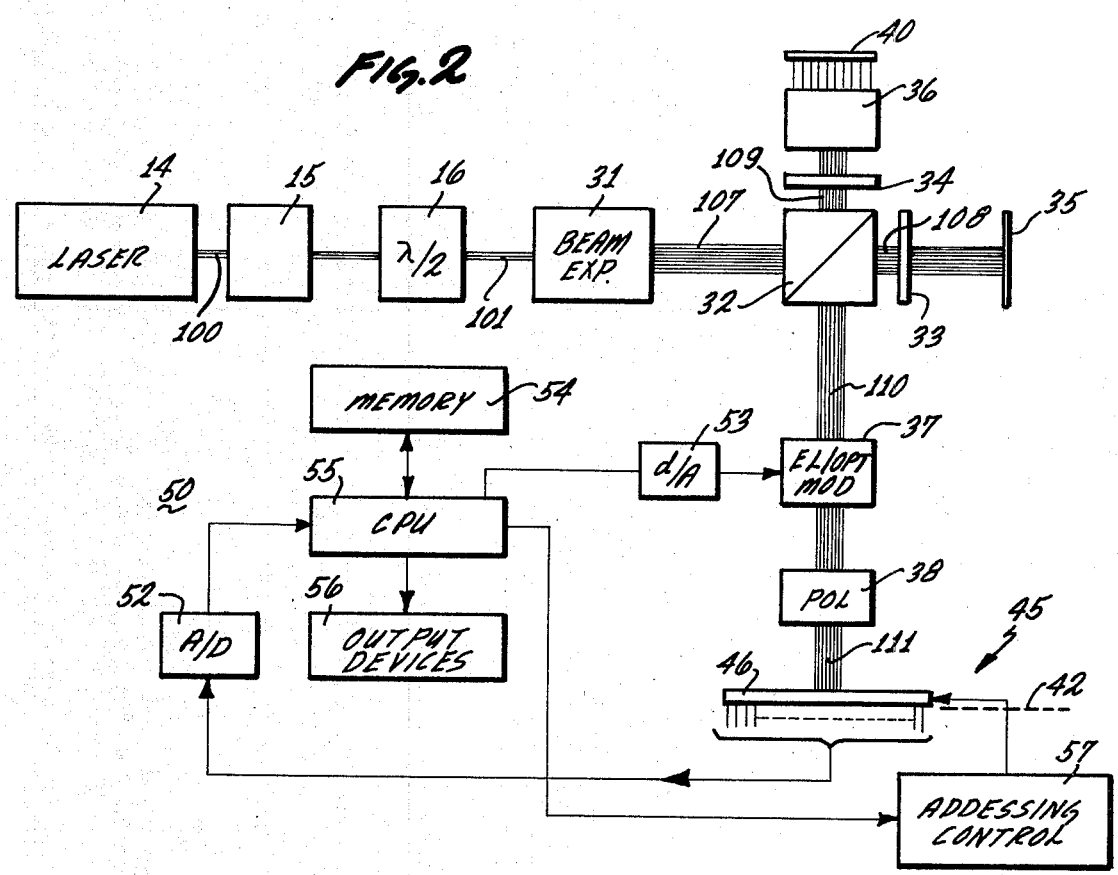
Fig. 2
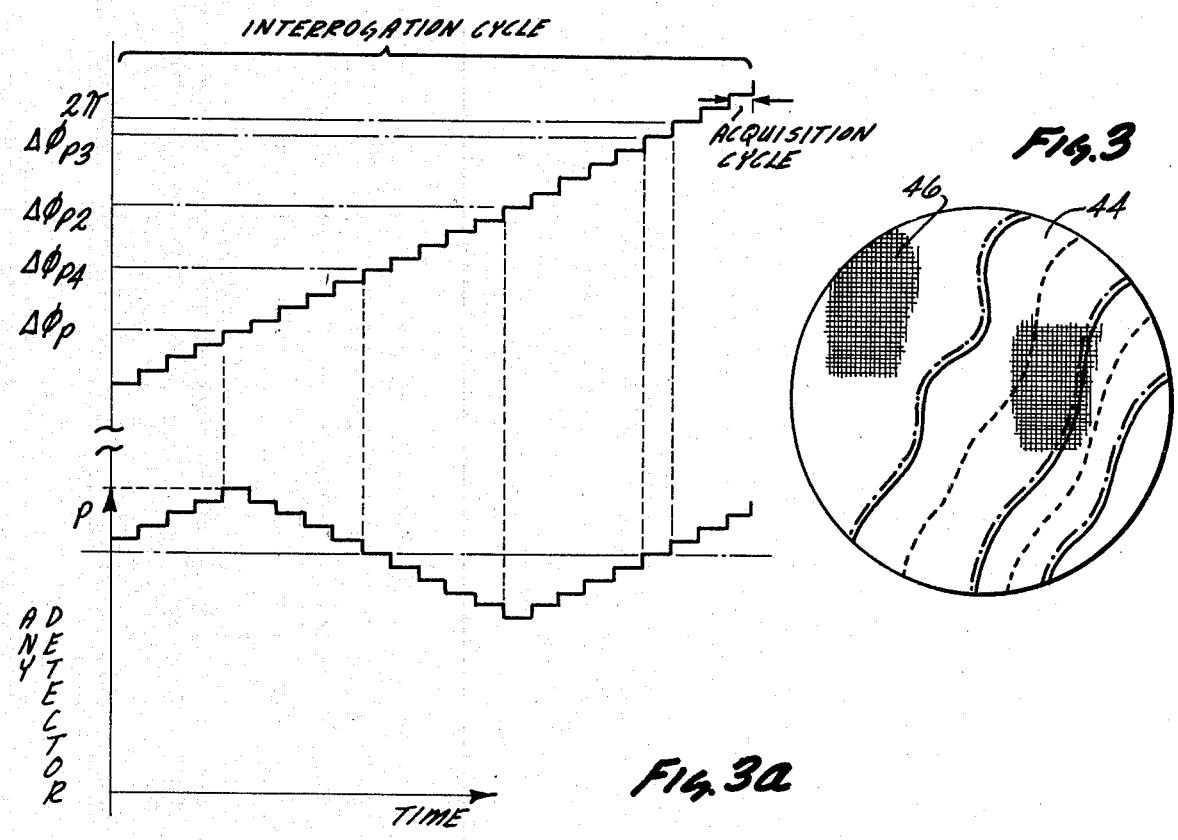
Fig. 3
Fig. 3a

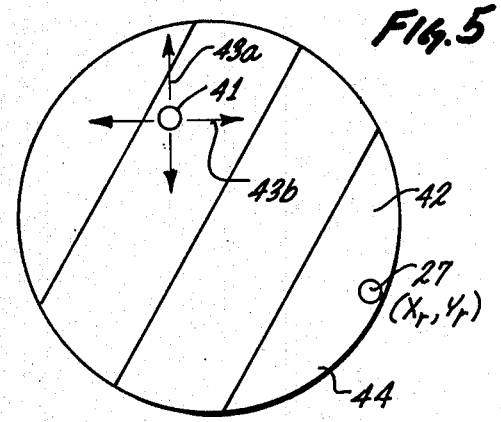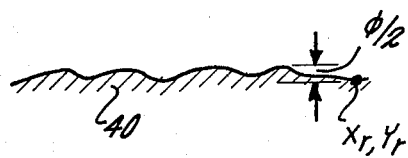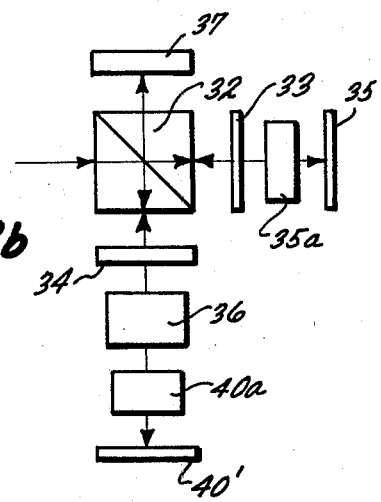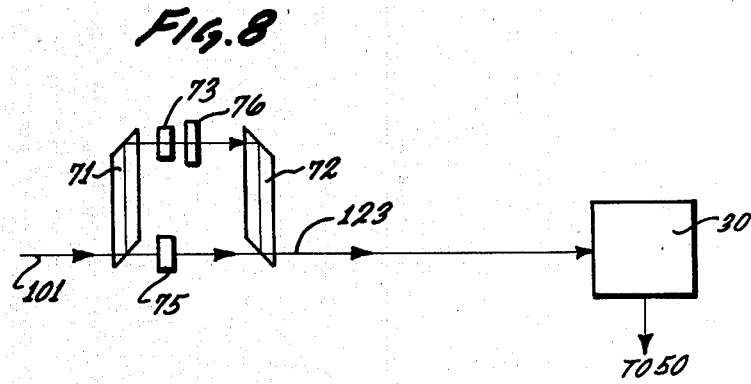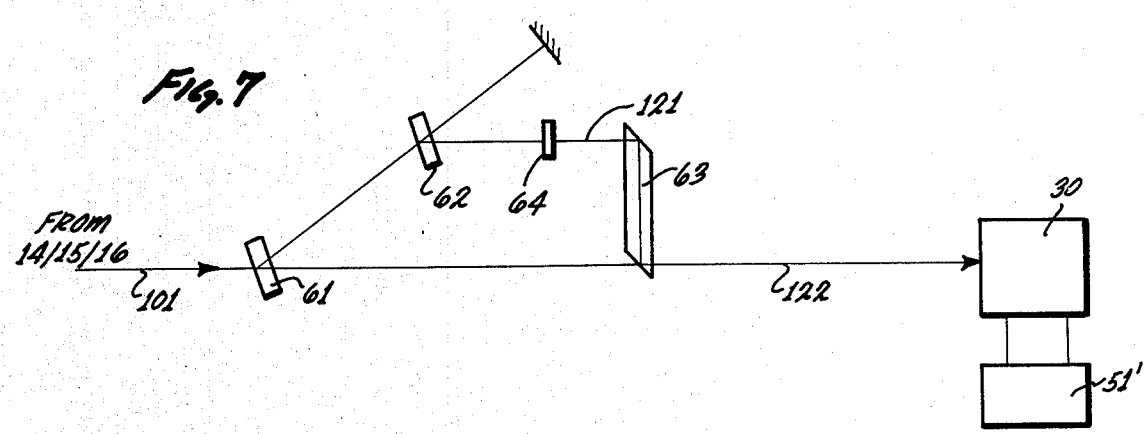

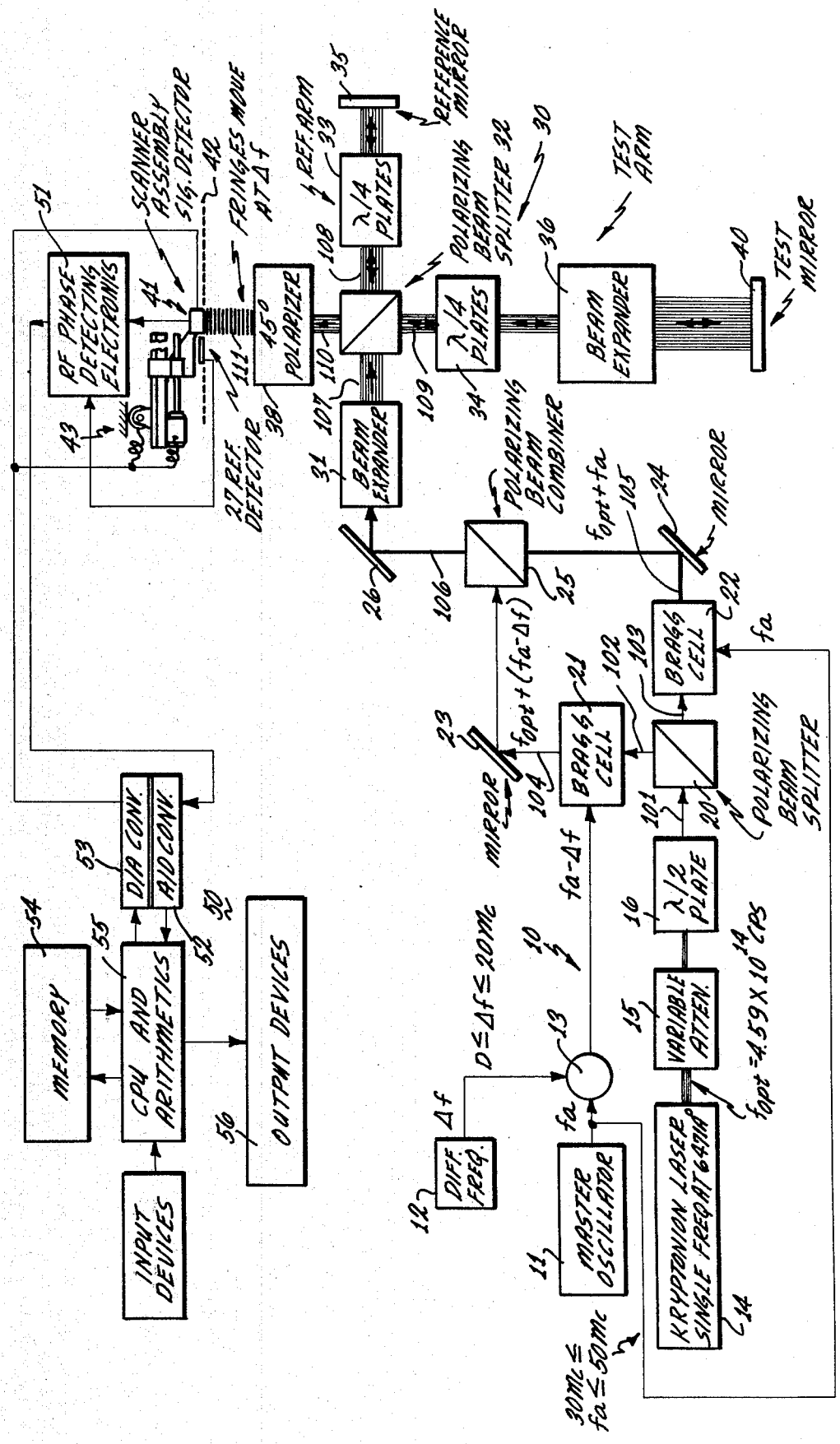

INTERFEROMETRIC METHOD AND SYSTEM

BACKGROUND OF THE INVENTION

The present invention relates to interferometers of the type to be used for detecting surface defects and other deviations of the surface contour of a mirror from the desired contour as well as inhomogeneities in a medium.

The art of interferometers is fairly well established. The "text book" variety of interferometers goes back, basically to Michelsen and consists of a light beam, a beam splitter directing components of the beam toward two mirrors and recombining the two reflected beams to obtain an interference pattern which can be used for a variety of purposes including the detection of flaws in one mirror while using the other one as a reference.

This kind of interferometer produces "fringes" which are lines of similar optical path differences (as between the test beam and the reference beam). In the case of reflecting surfaces the different fringes or fringe lines delineate the contours of the level difference between portions of the reflecting surfaces in units of $\lambda/2$ or $\lambda$, where $\lambda$ is the wave-length of the radiation used. The resolution of this method of determining the contour on the basis of optical path difference is, therefore, limited by the chosen wavelength. The present invention relates to an interferometer which still employs the basic principle of beam splitting, separate reflections on test and reference mirrors, and recombining the two reflected components for purposes of interference. However, the invention is directed towards an attempt to improve the resolution, specifically by improving the detection resolution of optical path difference measurements.

Other types of interferometers are known such as the Fabry Perot interferometer, or the Twyman Green interferometer which really is an outgrowth of the Michelson device. Aside from the restriction as to resolution outlined above, the known interferometers suffer from errors on account of vibrations of and in the equipment. Furthermore, there is a need to acquire electrical signals in a manner which permits the direct and immediate generation of data representing optical path differences. Moreover the electrical signals will be processed for purposes of further analysis of surface quality, homogeneity, etc; including the generation or contour maps or the like.

DESCRIPTION OF THE INVENTION

It is an object of the present invention to provide a new and improved interferometric method and system for obtaining a representation of the surface contour of a mirror or to measure homogeneity of a medium. The method and system should be highly immune to physical motion of the test object, and the method and system should be amenable to a high degree of automation of data acquisition without requiring high skills in optics.

In accordance with the preferred embodiment of the present invention, it is suggested to produce a test or inspection beam which includes two coherent components travelling together but having different polarizations so that they do not interfere. This composite beam is passed into a beam splitter designed to separate the two components having different polarizations, directing one towards a reference arm, the other one into a test arm which contains the test object, both arms return their components which are recombined. The resulting combination beam is polarization-processed to now obtain components of similar polarizations which are permitted to interfere. Photo detection means are used to detect the square of the sum of the electric field components in discrete points in a plane that intercepts this combination beam, and the detected signal in each point contains optical path length differences of the two components, now combined. One of the two differently polarized beam components is phase or frequency modulated, and the detected signal varies in amplitude in accordance with that phase difference or at that frequency. In the case of phase modulation, the phase of one component may be adjusted in each detection point to offset the effect of a local phase shift in the test beam on account of the local OPD of the test object. In the case of frequency modulating one polarization component the phase of the oscillating signal is directly indicative of the optical path length differences. If the two components have similar frequency, and phase shift modulation is not introduced either, the detected signal is still proportional to the cosine of the local optical path length information from the test arm, but the proportionality factor must be separately determined by detecting the two return components separately as to each detection point.

The test and reference objects can be mirrors whereby the test mirror is to be measured by the system as to its figure and surface contour to be referenced to the highly planar surface of a reference mirror. Alternatively, the test object may be a transparent medium whose homogeneity or inhomogeneity is to be detected. Of course, one still needs a reflector to return the test branch component for subsequent recombining that component with the returned reference beam.

Contour mapping, either of a test object surface or of the homogeneity of the transparency of a test object depends now primarily on the point by point detection process and on the resolution thereof (detection aperture) in conjunction with the resolution of a detection scanning raster. The resolution is no longer limited by the optical frequency involved. Alignment errors and physical vibrations of test object or mirror do not falsify the measurement but will be eliminated by the detection process. The reason for this is that one generates a time invariant phase pattern in the detection plane and detects it on a point by point basis. The optical wavelength of the radiation used is eliminated from the detection process.

DESCRIPTION OF THE DRAWINGS

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

FIG. 2 is a more detailed block diagram of an example for the preferred embodiment;

FIG. 2a is a cross-section through the test mirror on a very enlarged scale.

FIG. 2b shows a modification of the system of FIG. 1 for testing inhomogeneities in a transparent object.

FIG. 3 is a plane view of the inspection field system shown in FIG. 2;

FIG. 3a is a diagram of the detector acquisition cycle.

FIG. 4 is a block diagram for an alternative example of the preferred embodiment of the invention.

FIG. 5 is a view of the inspection field in the system of FIG. 4;

FIG. 7 is a modification of the system shown in FIG. 1 and 4, the modification being related to production of two coherent, superimposed beams;

FIG. 8 is a block diagram of a different embodiment of the invention, incorporating many components of the system as shown in FIGS. 1, 2 or 4.

Figure 1:
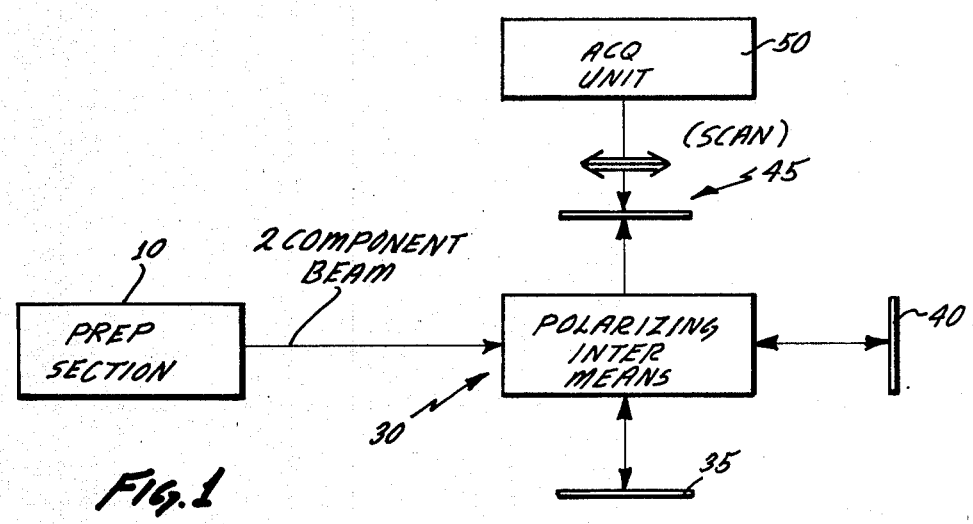
FIG. 1 is a block diagram of the general layout of a system in accordance with the preferred embodiment for testing mirrors.

Proceeding now to the detailed description of the drawings, the block diagram of FIG. 1 includes a preparatory section 10 for producing a composite test beam having, at least inherently, two components which differ in polarization. The system includes further an interferometric measuring section 30, a detecting and scanning section 45 and an electronic acquisition, evaluation and control section 50. As indicated by double arrows, the section 30 has a measuring or test arm or branch, and a reference arm or branch. It is assumed that the purpose of this assembly is to ascertain, for example, the surface contour of a mirror 40 and to detect any surface defects, unevennesses, etc. Mirror 40 is located in the test branch and in effect becomes temporarily incorporated in section 30. Reference numeral 35 refers to a reference mirror in the reference branch.

As symbolically indicated in FIG. 1, the detection section 45 receives an optical input from the section 30 in an output branch or arm thereof, and the detection section 45 provides electronic or mechanical scanning of the light intersecting in descrete locations in a detection plane. The data acquisition process is under control of the section 50 which receives the electrical signals acquired pursuant to the scanning process and generates optical path difference (OPD) data representing the figure of mirror 40. The processes and phenomena underlying the generation of an OPD contour map differ in the different examples on account of different types of modulations used (including one method using no modulation).

Turning first to FIG. 2, the optical input unit or section in this instance includes a krypton ion laser 14 issuing a beam 100 of a single frequency $f_{opt}=4.59\times10^8$ MHZ at a wavelength of 6471 Å. A variable attenuator 15 establishes a more suitable output level for the amplitude of the beam.

The optical output of the laser/attenuator assembly is linearly polarized but in an arbitrary plane. A λ/2 plate 16 is provided to adjust the plane of the linear polarization to a more suitable orientation. Presently, it may be assumed that the plane of polarization is adjusted to extend at a 45° angle to the plane of the drawing.

The radiation beam 101 as leaving the plate 16 has a transverse width which is basically established by the rather narrow output aperture of laser 14; a widening of the beam is required. One could widen the beam at this point to the dimension of the mirror 40 to be tested, particularly because any aberration introduced into the beam at this point will not falsify measurement; however, the optical equipment still needed for processing the beam before undertaking the measurement would become needlessly wide and very expensive. A widening of the beam at this point is therefore needed only to be commensurate with the detection resolution (infra). Accordingly, a first beam expander 31 is provided in the path of beam 101, producing a wider beam 107 still being of the composite nature as aforedescribed. Beam 107 may, for example, be widened to about 1" diameter.

The principal element of the interferometer is a polarizing beam splitter 32 which is oriented to separate the widened beam 107 into component beams 108 and 109 of different polarizations. One component will be polarized parallel to the plane of the drawing, the other one perpendicular to that plane.

Beam 108 is directed into the reference arm or branch of the device, passes a so called λ/4 plate 33 to become circularly polarized and is intercepted by the reference mirror 35 having a very high degree of planarity. The beam is reflected, returns on its incoming path and again is linearly re-polarized, but now being transversely polarized as far as its initial polarization is concerned so that the return beam of 108 is reflected by the beam splitter 32 towards its fourth port and becomes one component of an output beam 110.

The beam 109 is the test beam proper and passes likewise a λ/4 plate 34 to become circularly polarized. A second beam expander 36 expands the beam 109 laterally to the dimensions of the mirror 40 to be tested, or at least to the dimensions of the area of the mirror to be tested in one test run; for example, up to 4" to 6". The expanded beam is reflected into itself, and the reflected wave fronts (of equal phase) are spatially modulated in the direction of propagation and in accordance with the surface contour of the mirror 40 whereby this phase shift, in space, is twice the depth variations of the mirror on account of the fact that any increment of the test beam traverses any path increment twice.

The return beam of 109 is contracted by device 36, re-polarized to a linear polarization in 34 but now parallel to the plane of the drawing so that it passes the splitter 32 straight through and becomes the second component of composite beam 110. This beam is now composed of a first component having a polarization transversely to the plane of the drawing and planar wave fronts commensurate with the planarity of reference mirror 35. The second component of that beam has a polarization parallel to the plane of the drawing and a wave front that is spatially modulated by the surface irregularities (if any) of mirror 40.

The composite beam 110 passes through an electro-optical crystal 37 which is oriented to permit phase shifting of one of the beam components but not the other one. Devices of this type are known and they phase shift a beam passing through, i.e. they change uniformly the optical path length for a component having a particular polarization without changing the path length of any component having a perpendicular polarization. The degree of path length change and phase shift so produced depends on the voltage applied. One can readily cover at least one full wavelength in produced phase shift or a fraction thereof.

The phase modulation is thus polarization dependent and is passed through a polarization filter 38 which extracts from each beam component a particular subcomponent of identical polarization. These two subcomponents are, therefore, permitted to interfere, resulting in a beam which can be called an interference beam 111. An interference pattern can be picked up in any plane intercepting the beam path, such as plane 42 pertaining to the detection section 45.

Analytically, the situation can be described as follows: The component in beam 111 attributable to return beam 108 may have an electric field such as $E_1 = E_{10} \cos(2\pi f_{opt} + \phi_1)$ wherein $\phi_1$ is presumed to be constant as mirror 35 is presumed to be very accurately plane. The component in beam 111 attributable to return beam 109 may have an electric field such as $E_2 = E_{20} \cdot \cos(2\pi f_{opt} + \Delta\phi + \phi_2)$ wherein $\phi_2$ is a function that varies across the beam on account of the local optical path differences encountered by different portions of beam 109. $\Delta\phi$ is the phase shift introduced by the device 37. The two beams interfere; therefore, in each point in plane 42 the electric field is given by $E_1 + E_2$. This in turn means that in each point in plane 42 an irradiance is effective which is the square of that sum. That intensity can, therefor, be described as the sum of three components.

$$E_{10}^2 \cos^2(2\pi f_{opt} + \phi_1) + E_{20}^2 \cos^2(2\pi f_{opt} + \phi_2 + \Delta\phi) + 2E_{10}E_{20} \cos(2\pi f_{opt} + \phi_1) \cos(2\pi f_{opt} + \phi_2 + \Delta\phi).$$

In view of the fact that a detector in any point in the plane 42 will not be able to follow the optical frequency, the intensity being actually detected is the average over an optical frequency cycle and can be written as $$E_{10}^2/2 + E_{20}^2/2 + E_{10} \cdot E_{20} \cdot \cos(\phi_2 - \phi_1 + \Delta\phi).$$

This sum can be described as $S = S_1 + S_0 \cos(\phi + \Delta\phi)$ wherein $S_1$ is a background intensity and $S_0$ is the maximum intensity of the superimposed interference pattern. $S_1$ and $S_0$ are and should be constant if the beams have constant intensity across the width. However, it will become apparent that the inventive method does not at all depend on $S_0$ and $S_1$ being constant.

The equation for S includes two phase values, wherein $\phi_2 - \phi_1 = \phi(x,y)$ represents the local optical path difference of the two beams 108, 109 and $\Delta\phi$ is the phase difference produced by the modulator 37. The local optical difference is to be understood as follows. Take any point (x,y) in plane 42 and project that point back through the optical system onto mirror 40 as well as onto reference mirror 35. These two optical paths differ, and the function $\phi(x,y)$ describes that difference (modulo of the optical wavelength). The path difference varies as a function of x and y to the extent the surface of mirror 40 is not truly planar (or deviates otherwise from mirror 35). Thus, $\phi$ represents the surface contour of mirror 40 in units of $2\pi$ times the wavelength. The modulation phase shift $\Delta\phi$ is superimposed upon this function $\phi(x,y)$.

As a consequence, a fringe pattern is produced in plane 42. FIG. 3 shows by way of example, a fringe pattern (solid lines) in plane 42 and here particularly within an inspection field 44 which may be delineated by the boundary of the mirror 40 as projected back into plane 42. Upon changing that phase shift value $\Delta\phi$ the fringe lines are shifted. For $\Delta\phi = 0$ the fringe lines are particularly located representing a particular contour map of the mirror 40, e.g. as shown in FIG. 3. For $\Delta\phi = \pi$ the fringe lines appear shifted each by a distance such that a fringe line (dashed lines) will run through those points in plane 42 which appear halfway between any two adjacent fringe lines for the $\Delta\phi = 0$ situation.

Detector plane 42 includes an array of individually addressable detectors 46 arranged in an array and each detects the radiation (S) as received at its location. A portion of that detection array is also shown in FIG. 3; in reality it covers the entire inspection field 44. Each detector (i.e. its center) represents a descrete point in the x,y coordinate system introduced above, and its output in any instant is equal to the function $S = S_0 \cos(\phi(x,y) + \Delta\phi)$, wherein $\phi$ denotes the relative optical path difference of that point in the mirror 40 onto which one may project back (optically-geometrically) a point x,y in plane 42 and through the optical system of the section 30 as described.

The system includes the electronic acquisition unit 50 which is, basically, comprised of a central processing unit 55, a memory section or bank 54, output devices 56 for the display of, plotting of, or otherwise indicating the result of any computing operation to be made accessible to people. An additional output device is the electro-optical unit 37 receiving a control voltage through a digital-to-analog converter 53. This converter 53 provides the requisite voltage for obtaining a particular phase shift $\Delta\phi$. The voltage is produced on the basis of the acquisition program executed by the facility 50. In addition, unit 55 provides addressing signals to an addressing device 57 for accessing (enabling) the individual detectors of array 46. The detector outputs are tied together, and individual accessing of the detection array amounts to a time sharing-multiplexing of the outputs of the detectors 46. The common single output as multiplexed is fed to the facility 50 via an analog-to-digital converter 52, to be processed as a digital-signal in a manner to be described shortly.

The acquisition program operates as follows. An acquisition cycle is characterized by running through all detector addresses and in each instance the output of one detector of the array is digitally inputted to system 50. After such a cycle has been completed in that all detectors of array 46 have been interrogated, the program furnishes a number to device 53 to increase the voltage applied to phase shifter 37 by one step amounting, for example, to an increase in the phase angle by a few degrees. Now the acquisition is repeated, followed by another increase in the phase angle $\Delta\phi$. One will run through as many acquisition cycles as needed to increment $\Delta\phi$ e.g. from zero to $2\pi$. The number of steps, i.e. the incremental change in the phase $\Delta\phi$ is arbitrarily selectible and is one parameter that determines the resolution of the system.

It can readily be seen that for a control voltage of zero, $\Delta\phi = 0$, a particular fringe pattern is established such as shown in FIG. 3. Upon incrementing the control voltage for device 37 by a small step, the fringe line pattern is shifted, for example to the dash-dot line pattern as shown in FIG. 3. Upon stepwise increasing the phase shift as shown in the staircase curve of FIG. 3a, the fringe line pattern is shifted, so to speak, across the inspection field 44 and steps until the voltage applied to cell 37 is so high that the shift produced equals a full wavelength. Now the original pattern is restored and all the requisite acquisition cycles have been run through for a complete acquisition sequence or interrogation cycle.

As far as inputting of the data is concerned, each detector cell or array 46 is associated with one or several memory locations. As a detector cell is addressed, these locations receive (a) the digital value of the brightness signal provided by that detector and (b) the current phase value $\Delta\phi$ used during that cycle. In the next cycle, the stored signal value is compared with the new one. If the new one is larger, it replaces the stored value and the stored phase is replaced by the phase of the current cycle. If the new signal value is smaller, the stored values for signal and phase remain.

Thus, at the end of an acquisition sequence (interrogation cycle) each group of memory locations associated with a single detection cell holds a phase value which is or represents that phase shift that caused a fringe line to run through the particular cell. The measuring values associated therewith could be dumped; they are all approximately similar; ideally they should be identical but for tolerances, differences in the characteristic of the cells etc. The differences in the various measured amplitudes represent also any differences in the parameter $S_0$ and $S_1$ across the inspection field. It can readily be seen that the inventive method eliminates these variations as the OPD information is exclusively contained in the stored phase information, representing that phase shift $\Delta\phi$ which caused a fringe line to run through the respective detection cell. The intensity of any of the fringe lines does not enter into the measurement; a fringe line is established by lower intensity values to either side and that is represented in the measuring results by the fact that during the respective previous and the succeeding acquisition cycles, phase shifts of smaller intensities were detected by the particular cell. Absolute values of intensity are irrelevant.

The various stored phase values are directly proportional to the desired OPD map information. To state it differently, in the case of true, planar mirrors, the intensity should be more or less uniform throughout the entire inspection field. Any local unevenness in the test mirror distorts the wave front and produces phase shifts which are reflected in the function $S = S_1 + S_0 \cos(\phi + \Delta\phi)$.

The method explained above introduces for each point in the detection plane that amount of compensating phase shift ($\Delta\phi$) needed to obtain S=maximum, and that particular compensating phase shift is equal to the local OPD value.

As shown in the diagram of FIG. 3a, the phase $\Delta\phi$ (being proportional to the voltage applied to the cell 37) is stepped from cycle to cycle. Each step (in time) denotes the length of one full acquisition cycle. Any of the detectors may provide a sequence of inputs as drawn underneath the staircase signal. The signal amplitude value P is the one that remains stored in the memory location associated with the particular cell, together with the particular phase $\Delta\phi_p$. As stated, the result of a scanning sequence, one acquisition cycle, is a plurality of phase values $\Delta\phi$ stored in locations uniquely related and associated with the detector cells of array 46. Some of these cells will hold values $\Delta\phi = 0$; those are the cells located on fringe lines during the first acquisition cycle. One of these cells can be used to establish, quite arbitrarily, a zero level for the OPD relief of the mirror 40. The cells located along that same line will also be at that zero level. Still other cells may also hold $\Delta\phi = 0$ values, and they are located under other fringe lines during the first acquisition cycle. These lines are deemed at an "altitude" $+\lambda_{opt'}$ or $2\lambda_{opt'}$ or $-\lambda_{opt'}$ etc.

Other stored phase values represent fine resolution values for the elevational levels between the fringe line levels ascertained originally and spaced from each other as far as elevation is concerned by a single wavelength value. Processing the phase data must take these aspects into consideration to draw the requisite contour maps if that is desired. It should be noted, however, that outputting the phase values as stored and presenting them numerically in a raster or array corresponding to array 46 is already valuable information which is meaningful to anybody skilled in interpreting numerical data geometrically.

Figure 6A:
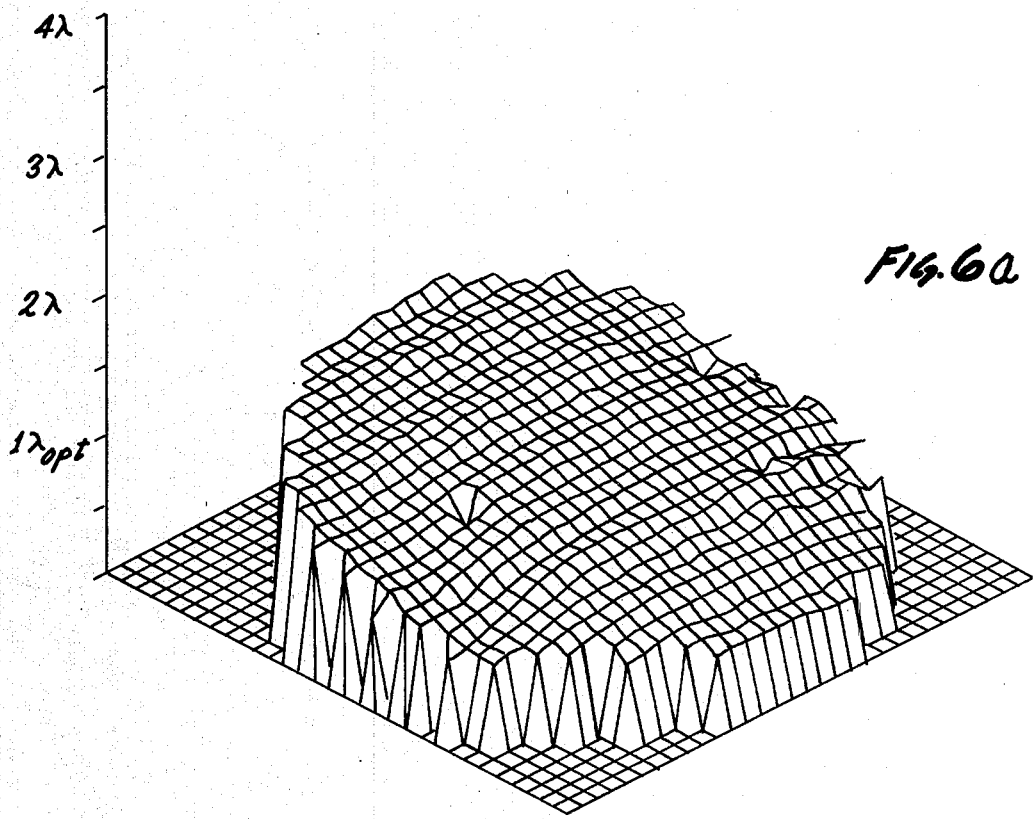
FIGS. 6a and 6b are representative examples of contour diagrams that can be obtained with the system shown in FIGS. 1, 2 or 4.

FIGS. 6 and 6a depict contour maps drawn by a plotter for a three-dimensional model. The intersections of grid lines are the acquired elevational-phase data augmented by $\lambda_{opt'}$ $2\lambda_{opt'}$ etc. as needed. The grid lines are simply added as straight lines for purposes of visual interpretation and connect phase values of adjacent raster points. The above-mentioned phase angle zero lines would be contour lines resulting from intersection of the contoured surface with horizontal planes traversing the vertical axis at $\lambda_{opt'}$ 2 etc.

It will be appreciated that detecting the particular phase shift in which each detector sensed an input maximum is just one way of proceeding. One may well chose the minimum. Still alternatively, one could determine the average brightness in the field, i.e. just algebraically summing all inputs acquired during the first cycle divided by the number of detection cells. The processor will detect, in subsequent cycles, for which phase $\Delta\phi$ the output of a detector is, approximately at least, equal to that value, and the phase shift will be stored. This then amounts to a detection of zero crossings.

The phase values acquired by these methods will necessarily differ, depending upon detection of maximum, minimum or average brightness as to each cell. Looking at the example case of FIG. 3a, detection of a brightness minimum for this particular cell will cause the acquisition of phase $\Delta\phi_{p2}$ and detection of the average will cause acquisition either of $\Delta\phi_{p3}$ or of $\Delta\phi_{p4}$. In order to avoid any ambiguity, an algorithm may be chosen to respond to presence of an intensity-equal-to-the-average when the previous value was smaller or larger. Either is possible, one merely has to be consistent. The resulting contour map (FIG. 6, 6a) however, will be the same in all instances, just the vertical scale is shifted up or down.

Figure 6B:
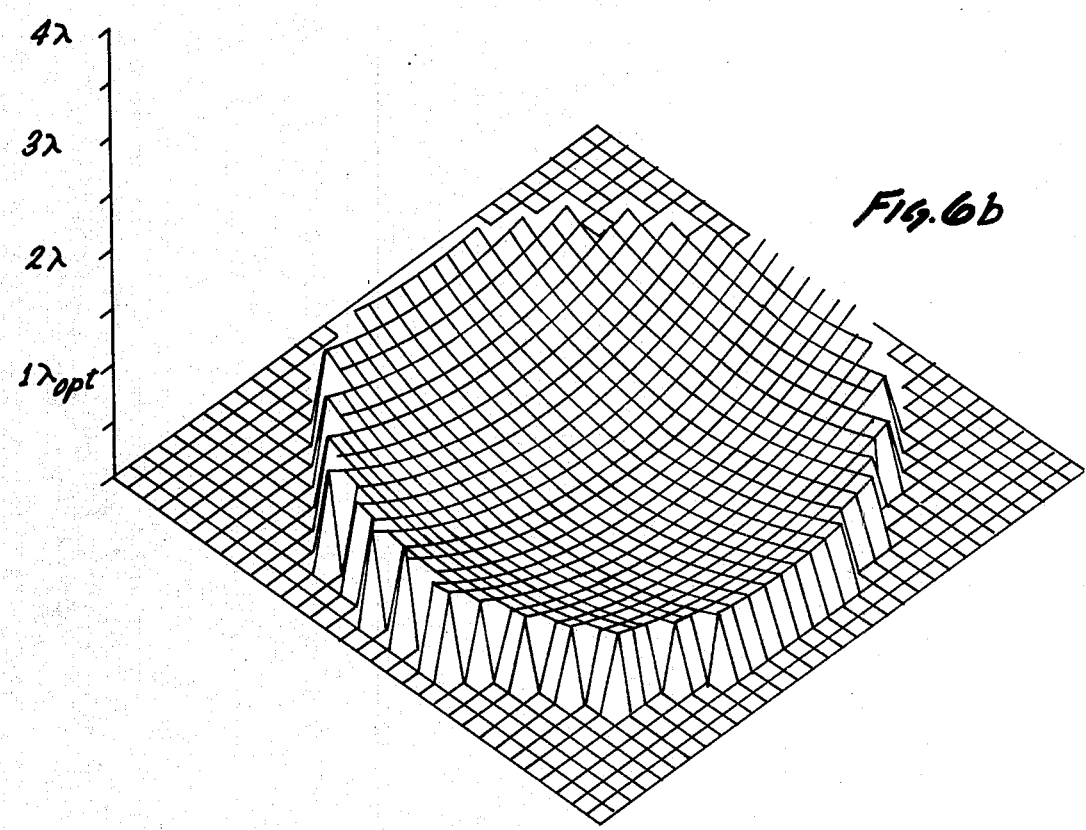

It should be realized that the method is not limited to the detection of planarity of mirrors but one will detect per se the existing contour. This contour may, for example, be a curved one (spherical, parabolic, etc.) and the resulting map simply depicts that contour (FIG. 6a). If the reference mirror is likewise a curved one, e.g. having "ideal" curvature as to its surface, the resulting map will merely represent the deviation of the actual contour of the test mirror from the contour of the reference mirror (FIG. 6b).

The method and system as described is highly invariant to mirror oscillations. These physical oscillations cause the signal levels as picked up by the detectors to vary accordingly. Through filters and sufficiently long periods of signal detection as to each detector in the array one may readily pick up an average signal level. Alternatively, one may modify the operation, particularly if the acquisition cycles run much too fast to permit dwelling on each detector over periods longer than any physical oscillation periods in the system. For example, one cell can be selected to be addressed and interrogated much more frequently as others. This cell may well be a regular detection cell within the array, but its output is used for generating a reference value to be used for eliminating signal variations in the detection field on account of physical vibrations. For example, throughout each and all acquisition cycles, during the entire interrogation sequence, every other addressing cycle as far as individual detector cell accessing is concerned, may cause access to that one reference cell, to determine the intensity it detects and any variations thereof, as frequently as possible.

Prior to beginning each acquisition cycle but after the voltage for the phase modulation by the device 37 has been increased by one step, that reference cell is accessed repeatedly in immediately succeeding access steps to determine an average value in the intensity as it may vary on account of vibrations of the mirrors. Having determined an average value, that value is used as a reference during subsequent acquisition of the measuring result of the cells of the entire array. During that acquisition cycle the output of that cell as repeatedly sampled is compared with the previously acquired average reference, and any deviation is used to adjust the voltage for modulator 37 to introduce a compensating change in the effective phase shift $\Delta\phi$ so that the intensity as detected by the reference cell remains constant during the cycle. The reference is established anew for the next acquisition cycle etc.

As far as long term drift is concerned or relatively slow vibrations, errors resulting therefrom can be eliminated by data processing. For example, calibration procedures will have determined the precise value for the voltage to be applied to modulator 37 to introduce a $2\pi$ phase shift. In other words, that voltage when applied should provide a modulation and phase shift reproducing the original ($\Delta\phi=0$) interference pattern. That, however, may not be true on account of drift. The difference in phase shift needed to produce the original interference pattern represents a correction which can be used to correct the contour map. It can be presumed that the acquisition of all the phase values is carried out on a regular basis so that each phase value as stored inherently represents also the time when it was acquired. In fact, the time of acquisition is directly proportionate to the stored phase value. Therefore, the correction needed will be a fixed percentage of the correction found at the end of the acquisition sequence and to be added or subtracted to the stored phase values.

It can also be seen that the method is basically invariant to (stationary) tilting of the mirrors. Tilting introduces a constant sloping in the contour upon which the true contour is superimposed. That tilt could actually be eliminated by computer processing and by averaging the elevational values.

If the two mirrors 35, 40 are at right angles to each other, but the optics in-between is rotated about a vertical axis (as far as the plane of FIG. 2 is concerned), the parallelism of the two components in the output beam 110 will not be disturbed; in other words, the beams combine without having intersecting optical axes.

The polarization type beam splitting arrangement 32, 33 and 34 is provided primarily for purposes of avoiding losses. It is essential that the beams are not allowed to interfere until re-combined after having done their "work" in the two arms or branches, the test arm and the reference arm. One could use a regular beam splitter with polarization filters placed in each arm. However, on each passage, one would lose 50% beam intensity (or a total of 75%) and the resolution would suffer.

FIG. 2b illustrates that the inventive interferometer is not limited in its application to detect the contour of mirrors. The test arm in this instance includes a transparent medium 40a whose optical homogeneity is under investigation. Mirror 40' is a highly planar mirror as it is not the subject of the test and its planarity should be comparable to the planarity of mirror 35. Reference numeral 35a refers to a reference object that may be highly homogenic and is included here primarily to offset any amplitude attenuation in the test arm. However this reference object 35a is not required for practicing this method. The detection process will be exactly the same as described and the function being detected represents optical path differences as produced by different local propagation speeds in object 40a on account of any inhomogeneities.

In the example above, a modulation was introduced in form of a phase shift of one of the interfering components. It is immaterial in principle whether this controlled phase shift $\Delta\phi$ is introduced in the reference beam component or the measuring beam component. Decisive is that the phase shift is a variable one with as fine as resolution as desired. The phase shift is introduced anywhere in the optical path as it extends from laser 14. The step height for the phase shift changes is one parameter for determining the resolution of the contour map thus obtained. The other parameter is the density of the detection array, i.e. the finite width of each cell.

In the next example to be described (FIG. 4) the variable phase shift is replaced by a frequency shift. In this instance section 10 includes a master oscillator 11 producing a constant frequency signal of a frequency $f_a$. This frequency may typically fall within a range from 30 MC to 50 MC; possibly $f_a$ may be 40 MHz. As will be apparent below, this frequency is produced merely as an auxiliary operating parameter and may not become directly an operating parameter of the interferometric measurement.

A second oscillator 12 is provided to produce a frequency which for reasons of convenience may be called a difference frequency $\Delta f$. This frequency may fall within the range from 0 to 20 MC; typically $\Delta f$ will be 0.1 MHz. It may be advisable in cases to render the frequency of oscillator 12 adjustable permitting adjustment to very low values if visual inspection of fringe patterns is desired, otherwise $\Delta f$ should be in a range in which available Rf equipment can be used for purposes of phase detection. This frequency $\Delta f$ is a significant operating parameter and is characterized by the fact that the value is low as compared with the other operating frequencies in the system.

A summing network 13 plus filter receives the two outputs of oscillators 11 and 12 and produces the frequency $f_a - \Delta f$. The network 13 will also produce $f_a + \Delta f$, which will be suppressed. However, one could use this sum-of-the-frequency instead of the difference, the choice is an arbitrary one.

The basic optical input for the interferometric system is provided by a highly monochromatic source of electromagnetic radiation. Conveniently, this source will be also here a laser 14. The beam from laser 14 passes also an attenuator 15 and a $\lambda/2$—plate 16 to orient the plane of polarization in a plane tilted by 45 to the plane of the drawing. The beam 101 is received by a polarizing beam splitter 20. The function of the splitter 20 can be taken from its designation. First of all, it splits the incoming beam into two components 102 and 103 of equal magnitude by extracting differently polarized components from the beam 101 and directing them into different directions. The orientation of plate 16 as defining the orientation to the polarization plane of beam 101 is instrumental in obtaining the amplitude equality. Since the beam splitting is carried out on the basis of polarization, the two beams 102 and 103 are now tagged by perpendicular polarizations. For example, beam 102 may be polarized transversely to the plane of the drawing and beam 103 will then be polarized in and parallel to the plane of the drawing. Both beams, however, remain coherent.

Beam 102 is received by a Bragg cell 21 and beam 103 is received by a Bragg cell 22. The Bragg cells are optically transmissive devices which upon being electrically stimulated propagate acoustic waves in a direction transversely to the direction of the beam propagation. These waves change the optical density in the Bragg cell medium and in such a manner that in addition to passing an unmodified (but slightly attenuated) beam each Bragg cell diffracts some of the radiation and produces an additional beam at an acute angle to the principal direction of propagation and respectively having up or down shifted frequency depending on the orientation of the Bragg cell. Thus, a frequency shifted beam leaves each of the Bragg cell at the so called Bragg angle, the two beams being denoted 104 and 105 respectively. Accordingly, beam 104 is a beam of light being polarized transversely to the plane of the drawings and having a frequency of $f_{opt}+(f_a-\Delta f)$; beam 105 is a beam of light being polarized in the plane of the drawings and having frequency of $f_{opt}+f_a$. Again, one could use the difference-of-the-frequencies (e.g. $f_{opt}-f_a$) which is an arbitrary choice but the choice should be the same for the two cells.

A pair of mirrors 23 and 24 respectively redirects the two beams 104, 104 into a polarizing beam combiner 25, which by virtue of the specific polarization causes beam 104 to be reflected by 45° while permitting beam 105 to pass so that a combination beam 106 leaves device 25. The two beams are still coherent though having slightly different frequencies, the difference being equal to $\Delta f$; however, the two beams do not interfere on account of their different, orthogonally oriented polarizations. This beam 106 is the output beam of the section 10.

A mirror 26 directs the beam 106 into the interferometer measuring section 30. The input of that section therefore is a beam having the properties as listed above. That beam is laterally expanded by the expander 31 whose function is the same as outlined above with reference to FIG. 2. The function of the polarization dependent measuring section 30 has also been described already and does not have to be repeated. Suffice it to say that the output beam 110 from section 30 is now composed of a first component having (a) the frequency $f_{opt}+f_a$; (b) a polarization transversely to the plane of the drawing, and (c) planar wave fronts commensurate with the planarity of reference mirror 35. The second component of beam 110 has (a) a frequency of $f_{opt}+f_a-\Delta f$; (b) a polarization parallel to the plane of the drawing and (c) a wave front that is spatially modulated by the surface irregularities (if any) of mirror 40.

This composite beam 110 after leaving the exit port of splitter 32, is also passed through a 45° polarization filter 38 which extracts from each beam component a particular component of identical polarization. The resulting two beams are, therefore, permitted to interfere, resulting in a beam which can be called an interference beam 111. An interference pattern can be picked up in any plane intercepting the beam path, such as the plane 42. Analytically, the situation can be described as follows.

The component in beam 111 attributable to return beam 108 may have an intensity such as $I_1 = A_1 \times \cos(2\pi f_1 t + \phi_1)$ wherein $f_1 = f_{opt} + f_a$ and $\phi_1$ is presumed to be constant as mirror 35 is presumed to be very accurately plane. The component in beam 111 attributable to return beam 109 may have an intensity such as $I_2 = A_2 \times \cos(2\pi f_2 t + \phi_2)$ wherein $f_2 = f_{opt} + f_a - \Delta f$ and $\phi_2$ is a function that varies across the beam on account of the local optical path differences encountered by different portions of beam 109 on account of the surface irregularities of test mirror 40. These two beams interfere, that is to say their intensity can be detected as the product of their individual intensities (electric field vector) which may be different in any point in plane 42 or in any other plane transverse to the beam 110, downstream from polarization filter 38.

The two interfering beams do not have the same frequency and the interference pattern can be described by the equation $S = S_0 \cos[\phi(x,y) + 2\pi \Delta f t] + S_1$, wherein $\phi = \phi_2 - \phi_1$ represents again the local optical path difference of beams 108, 109 as a function of x,y which coordinates have been introduced above in the inspection field 44. The interference pattern is a time variable one due to the difference in frequency, the variation having the frequency of $\Delta f$. This equation is similar to the interference pattern equation introduced earlier, except that presently S contains a time variable component on account of the frequency differences. The two components $S_0$ and $S_1$, represent the same parameters introduced above.

A signal detector 41 is disposed in plane 42. The detector has a rather small aperture and detects the local beam intensity within its small field of view of detection field; particularly, the photoelectric detector responds to the incident electrical field and produces an output current which is proportional to the product of the two local beam intensities (optical heterodyning). The electrical output current of the photoelectric detector 41 is therefore, proportional to $\cos[\phi(x,y) + 2\pi \Delta f t]$, the proportionally factor itself is proportional to the amplitudes of the two beams and is constant locally in each instance, but may vary across the inspection field 44.

The detector 41 is mounted so that it can be moved in the detection plane 42, for example, by means of a motor driven cross slide arrangement 43 or the like which establishes individual scanning positions in accordance with an array of raster points in plane 42 for purposes of detection. This way the detector can be positioned in the various locations of the scanning raster in plane 42 and particularly in the inspection field 44 thereof covering the width of the composite beam and being large as compared with the aperture of detector 41. A photoelectric detector 27 of similarly small aperture has a fixed position in plane 42 and near the boundary of the inspection field 44 otherwise covered by detector 41. Detector 27 may structurally be quite similar to detector 41. Thus, they merely differ by the fact that one is moveable (41) and one is fixed. They both produce outputs having the frequency of $\Delta f$. The relationship of the signals will be discussed below.

FIG. 5 is a representative example of the detection field 44 showing a fringe pattern as it could be taken from plane 42 and as it could be seen, if, for example, a simple reflective medium were placed in that plane. Such an image could also be seen by an observer when looking from the back at a translucent plate, e.g. a frosted glass plate when placed in that plane 42. Normally, such direct image producing device is not present in plane 42, rather the detector 41 looks at a very limited portion of the radiation in plane 42 but covers stepwise the inspection of the field such as delineated by circle 44 in FIG. 3.

Arrows 43a and 43b depict the displacement the detector 41 undergoes in the plane 42 (being the plane of the drawing of FIG. 2) when moved by the cross-slide 43. Details of the detection process in field 45 will be discussed below; suffice it to say presently that generally the light intensity oscillates in any individual spot within field 44; including the fixed location of detector 27 so that both detectors produce a.c. signals. Upon stepping the position of detector 41 systematically through field 44 one obtains a scanning raster for detecting oscillations and other relevant optical information in the inspection field.

The output signal of the detector 41 is fed to a phase detecting electronics 51 which receives also the output of detector 27 as reference signal. The output of circuit 51 is a d.c. signal which represents the phase difference between the reference signal and the detector signal. Why and how the phase difference is representative of contour variations in the test mirror will also be developed below.

The output of electronics 51 is fed to the digitizer 52 feeding digital data to the CPU 55 of section 50 which constitutes also here the computing and digital data processing facility. The CPU 55 cooperates with the memory 54 to obtain stepwise acquisition and storage of the phase data and to execute the acquisition program. This acquisition program includes the stepping of cross slide 43 through the raster points in the detection plane and the area delineated by 44. Accordingly, the facility 50 may issue drive signals via digital-to-analog converter 53 for operating the cross slide drives which position and reposition the cross slide 43 and the detector 41 thereon. The control may be somewhat more complex and may include feedback and accurate position measuring devices, etc. However, such devices are well known and do not require elaboration. Generally speaking, devices to position an object very accurately (e.g. detection and pick up device) are known and can ve used in this environment.

In addition, the facility 50 correlates the phase data acquired and taken from the phase detector 51 with the coordinates of the raster points (x,y) as established by the cross slide and detector 41, under control of facility 50, and the facility 50 may convert these phase data into elevation points in an x,y,z coordinate system. These data may be printed out and/or plotted in a manner known per se in computer technology which does not require elaboration. Reference numeral 56 refers to suitable output devices. FIGS. 6 and 6b are representative examples of such a contour map, they are computer generated, three dimensional plots.

It should be mentioned that automation of the operation is convenient and practical, and the interferometer of the invention is particularly designed to permit such automation in the acquisition of phase data and the generation of contour maps or the like in response thereto. However, the data can be acquired manually, for example, by moving the detector 41 into the different position through operation of high precision adjustment spindles, and reading the phase difference from an instrument connected to the output of circuit 51.

After having described the system, the following summary may be in order. The section 10 in FIG. 4 produces a composite beam (106) in which two beams of slightly differing frequencies (the difference being $\Delta f$) are combined in the same optical path, but they are prevented from interfering with each other because the radiation of the beams has different, orthogonally oriented polarizations. Section 10, therefore, has the function of generating two highly monochromatic, tagged beams of slightly different frequencies. The frequency fa plays an auxiliary part only in that a Bragg cell does not function properly at the desired rather low frequency $\Delta f$, so that the laser beam frequency cannot be directly shifted in frequency in that manner. The frequency fa, therefor, is provided for placing the frequency shift into a range that can be handled by Bragg cells, and, as outlined above, the desired frequency difference comes about by using two Bragg cells operating at different frequencies, the difference being $\Delta f$. For practical reasons of signal processing and phase detection $\Delta f$ should be below about 5 MC. As stated, 100 KHz is a very convenient frequency.

The section 30 generates an interference pattern by means of which one can determine the planarity of the mirror 40 in a manner to be described more fully below. The interference pattern appears in the intercepting plane 42. The pattern can be described by the function $S = S_1 + S_0 \cdot \cos[\phi(x,y) + 2\pi\Delta ft]$, wherein that phase of this oscillatory function is directly related to the surface contour of mirror 40 in that it represents the local optical path difference as between mirror 40 and reference mirror 35. The acquisition process will now be described in further detail.

The coordinates x and y are coordinates in the plane 42 and each pair of such coordinates defines a point in plane 42, particularly in inspection field 44. Each point can be projected into the plane of mirror 40, the transformation in coordinates is given by the beam expander 36 and the projection path has a particular length. As stated, a similar projection can be made onto reference 35 resulting in a second optical path length. The function $\phi(x,y)$ defines, as to each point (x,y) the optical path length differences. The function $S = S(x,y,t)$ oscillates at the frequency of $\Delta f$ which is the same for each detection point in the entire inspection field 44, including the location of reference detector 27.

The detector 41 is moved from (x,y) position to (x,y) position in field 44, and detects the signal $S = S(x,y,t)$. That signal has the same frequency $\Delta f$ throughout but the phases may be different to the extent the local optical path length difference for any point in field 44 differs from the optical path length difference of any other point, such as the reference point (times 2 on account of the fact that the beams traverse twice each arm of the interferometer section 30).

The signal detected by the reference detector 27 could be described by $S_r = S_0 \times \cos[\phi(x_r,y_r) + 2\pi\Delta ft] + S_1$ wherein $x_r$ and $y_r$ denotes the chosen reference point in field 44 (or as projected back onto mirror 40—see FIG. 2a)·$\phi(x_r, y_r)$ therefore denotes a particular, constant reference phase. Thus, the phase difference between the reference signal and the detection signal represents the "altitude" difference between the current detector position point x,y as projected back onto mirror 40, and the "level" of the reference point $x_r$, $y_r$ on that mirror 40. The phase detector 51 detects the difference $\phi(x,y) - \phi(x_r,y_r)$. Upon positioning the detector 41 in the difference points of a scanning raster, a contour map of the mirror 40 can be generated. Section 50 actually processes the detection data to obtain such a contour map.

The input section 50 including phase detector 51 references the function S against the function $S_r$, and the time variations in the signals are eliminated for purposes of finding (x,y). Actually, one finds $\phi(x,y) - \phi(x_r, y_r)$ where $\phi(x_r, y_r)$ is a constant system's parameter; in fact, it establishes an (arbitrary) zero level for the optical path difference measurement on the basis of the phase detection as described. The phase distribution and optical path difference function $\phi$ can be used also here to draw directly the contour maps such as shown in FIGS. 6 and 6a.

The phase values as so established are not unambiguous but require modification and augmentation. The elevational pattern as established on the pass of such multiple raster points can be deemed divided by hypothetical lines of phase angle zero. The placement and overlay of these lines is quite arbitary per se and depends solely on the position of detector 27. Nevertheless, once the position has been chosen, a phase and altitude zero point and level has been established and other such hypothetical phase zero lines will represent contour lines at an altitude of $+\lambda_{opt}$, $+2\lambda_{opt}$, $+3\lambda_{opt}$, $-\lambda_{opt}$, relative to the reference point. The phase values detected in raster points between such "lines" represent corresponding intermediate elevations at a resolution depending, as stated, on the raster. An error can occur here only if the elevational difference between two raster points happens to be larger than one full wavelength $\lambda_{opt}$.

The accuracy of these detection proceedings are, of course, dependent upon the dimensions of the input aperture of detector 41 which will not sense any intensity oscillations in a point but necessarily over a finite area. Thus, strictly speaking, it was not quite accurate to speak of raster points, rather one should speak of an incremental raster area, though the center of that area could be deemed to define a raster point. The larger the raster area, the less pronounced will be the oscillation that can be detected, and an aperture about equal to any spacing of any two fringe lines will not perceive any brightness oscillations. Thus, the detector aperture should be small as compared with the fringe line spacing (see FIG. 5). It should be noted, however, that the raster points (defined e.g. as the center of the detector aperture) may well be spaced from each other at a distance less than the detector aperture width, i.e. incremental area under inspection by detector 41 as far as sequential inspections is concerned may overlap. Each such raster point yields a particular phase as to the detected electrical oscillation at the $\Delta f$ frequency, and the phase value is directly indicative of a relative elevational value of the mirror. The phase values together define the mirror unevenness at a resolution that is given by the raster point spacing; the resolution is not dependent upon the auxiliary modulation frequency fa and is only insignificantly dependent upon the frequency $\Delta f$ and the value for $\lambda_{opt}$.

The mode of representing the surface contour of mirror 40 is a matter of convenience. Conceivably, one could move the detector 41 into positions in which the detected phase has particular value and on as fine a scale as such a position control permits. Thus, rather than operating on the basis of a fixed pattern of raster points, one could map the plane 42 in field 45 to detect equal phase points. Moreover, in many cases it may suffice to determine the root mean square value of the deviation of the contour from the true planarity.

The method and system as described with reference to FIG. 4 are also highly invariant against error sources. For example, either one of the mirrors 40 and 35 may undergo displacement, even oscillation transversely to their extension. However, any change in optical path length in either of the two branches will not enter into the detection process because the resulting phase changes affect signal and reference detection (41, 27) equally. In other words, $\phi(x,y)$ and $\phi(x_r, y_r)$ vary synchronously so that $\phi(x,y) - \phi(x_r, y_r)$ as detected by phase detector 51 is free from this variation. However, vibrations of a frequency similar to $\Delta f$ may still interfer with the detection process. On the other hand $\Delta f$ is a free parameter, and it can readily be chosen to be well above any expected mechanical vibration frequency which any part of the equipment involved may undergo. The invariance to tilting described above is also true in this example.

The scanning device 41/43 has been described primarily as an alternative. Instead of the electro-mechanical type scanning and physical movement of the detector, one could use electronic imaging equipment with electron beam type scanning or one could use a detector array composed of semi-conductor elements which are being scanned and interrogated individually such as described with reference to FIG. 2. In all these instances, however, the scanning process should be under control of or supervised by the computer 50 because it is absolutely essential to correlate raster point identification with acquired phase data. However, the scanning unit may be autonomous and may furnish the position data to the acquisition electronics 50.

As was outlined earlier, the frequency $f_a$ is, in fact, merely an auxiliary frequency of no immediate significance; it is used because the type of modulation employed (Bragg cells) does not permit direct modulation by means of the frequency $\Delta f$. A lower difference frequency $\Delta f$ is useful for permitting simpler rf electronics in the circuit 51. However, that is not essential. In the embodiment above, cell 21 could be eliminated in which case the difference frequency would be fa. As that frequency is rather high, one would need a VHf balanced mixer in lieu of a mere rf phase detector 51.

FIG. 7 explains a different preparatory circuit for the system. The incoming laser beam 101 of predetermined polarization is split in a first Bragg cell 61 into a unmodified component having frequency $f_{opt}$ and a phase shifted component $f_{opt} + f_a$. The latter beam is phase shifted in a second Bragg cell 62 to obtain the frequency $f_{opt} + 2f_a$. The latter beam runs parallel to the beam that passes the Bragg cell 61 so that any jitter affects both beams. The beam 121 passes through a polarization rotator 64 so that the plane of polarization is rotated by 90°, for example, from the plane of the drawing to a plane transverse to the plane of the drawing.

The beam, next, enters a glass device 63 shaped like a parallelogram and oriented as depicted, so that the beam 121 is totally reflected. The second oblique surface of device 63 functions as a beam combine so that a combined beam 122 leaves the device. This beam will be expanded and further processed by the device 30 explained above. The detection process requires a balanced mixer 51' for this case.

The examples of the invention as explained thus far operate on the basis of modulating (phase or frequency) one of the polarized beam components. The difference in phase or frequency in the test and reference beams result in detectable phase differences directly representing local optical path differences in representation of mirror unevenness. This is the preferred mode of practicing the invention.

FIG. 8 illustrates a system in which two differently polarized beams are used for purposes of contour mapping the mirror 40, without phase or frequency modulation.

The laser beam 101 is split into two portions by an optical parallelogram 71 and recombined by a second parallelogram 72. The two branches include respectively two optical shutters 73 and 75, and one branch contains a polarization rotator 76 so that the two beam components when recombined into composite beam 123 have perpendicular, linear polarizations and will not interfer.

The composite beam is received by the unit 30 constructed as before except that the reference detector 27 has been omitted. However, the detector 41 (or an array 46) is still used to detect local intensity. Moreover, in each position detector 41 measures three intensity values. One value is obtained when shutter 73 is closed, the second value is obtained when shutter 75 is closed and the third reading is taken when the shutters are both open.

If one were to measure local intensity only when both shutters are open, one could map, in fact, an interference pattern in the inspection field 44 on a conventional basis, amounting, in effect, to the detection of relative intensities and detection of fringe lines, followed by mapping of the contour of the mirror 40 with the conventional low resolution.

The interference patterns can be described generally by $E_{10}^2/2 + E_{20}^2/2 + E_{10}E_{20} \cos \phi$ wherein $\phi$ is again the phase and optical path difference function introduced above. Fringes occur for example when the sum above has a minimum. The two additional readings taken with only one shutter (or the other one) open, serves to determine individually the values $E_{10}^2/2$ and $E_{20}^2/2$ in the relation above. Let one beam have a local intensity in the detection plane equal to $E_{10} \cos (2\pi f_{opt})$, the other one an intensity equal to $E_{10} \cos (\phi(x,y) + 2\pi f_{opt})$, then the intensity as detected in any given point in inspection field 44 will in fact be equal to $E_{10}^2/2$ with one shutter closed. The detected intensity will be equal to $E_{20}^2/2$ when the other shutter is closed. When both shutters are open, the intensity is equal to the sum $E_{10}^2/2 + E_{20}^2/2 + E_{10} \cdot E_{20} \cos \phi$. Thus, the two unknowns $E_{10}$ and $E_{20}$ in the relation above are readily detectible and $\cos \phi$ can then be calculated by the processor 50. It should be noted that this acquisition of data, i.e. the measuring of three intensity values is also carried out on a point by point basis within the x,y inspection field. The amplitude value $E_{10}$ and $E_{20}$ may well be functions of x and y, but the threefold detection eliminates these amplitudes as parameters to obtain just $\phi(x,y)$. There is no further proportionality factor present in the system because all conditions remain the same, except for the states of the shutters, whereby each shutter participates in two readings by just being open and does not modify the beam further. In other words, the shutters themselves do not modify the values for $E_{10}$ and $E_{20}$, they merely permit or inhibit the detection of these values.

Figure 9:
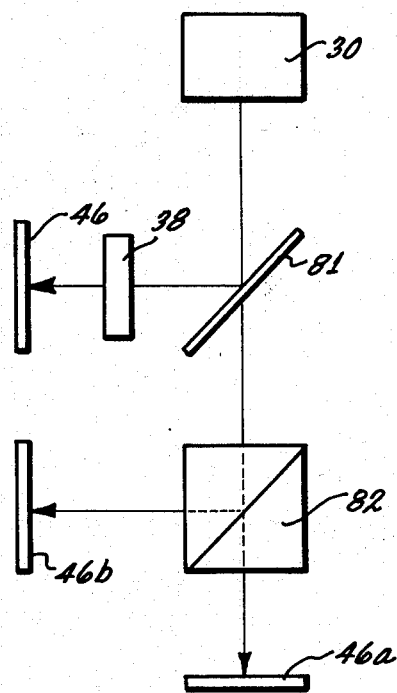
FIG. 9 is a block diagram of a still further embodiment of the invention, likewise incorporating many components of the system as shown in FIG. 1, 2 or 4.

This particular method can be carried alternatively by detecting the three intensities simultaneously. As shown in FIG. 9, reference numeral 30 is again the interferometric section as described. Its optical input is as shown in FIG. 2, there being no modulation of any kind. The two orthogonally polarized components have a constant phase relation and are of identical frequency.

The two component output beam is split into three branches downstream from splitter 32; a first branch is split off by means of a semitransparent mirror 81 and passed through polarization filter 38 to produce the interference beam. This beam is subjected to the raster scanning process in an intercepting plane as described, using an array 46. The component permitted to pass through mirror 81 is polarization-split by a beam splitter 82 being quite similar to splitter 32. Arrays 46a, 46b intercept these components individually. These arrays 46a, 46b are similar to array 46, and they are preferably operated in synchronism with each other. Moreover, the three arrays must be positioned so that they are geometrically compatible. Any point x,y in the array 46 as represented by one detector cell therein, must be represented by corresponding points and cells in arrays 46a and 46b, all leading back to the same point on mirror 40 so that these amplitude data can, in fact, be related to "one" point. Thus, one detects for each such "point" x,y a first intensity that is proportional to $E_{10}^2$, a second intensity which is proportional to $E_{20}^2$ and a third intensity that is proportional to $E_{10}^2/2 + E_{20}^2/2 + E_{10} E_{20} \cos \phi$. The proportionality factors are separately determined by any deviation from a precisely 50% split by mirror 81, and by any additional and, possibly, unequal losses in splitter 82. The desired value for $\phi$ can now be determined analogously as described above with reference to FIG. 8.

The invention is not limited to the embodiments described above but all changes and modifications thereof not constituting departures from the spirit and scope of the invention are intended to be included.

I claim:

1. Interferometer for measuring optical properties of a test object definable as local optical path length differences, such as the surface contour of a test mirror or the homogeneities of medium, comprising:

means for producing a beam of monochromatic radiation having two components, having perpendicular polarizations;

means disposed for receiving the beam and separating the two components or portions thereof, and having an orientation to direct one of the separated components into a test branch which includes the test object, the other one to a reference mirror, the test branch and the reference mirror reflecting the respective components, the means for receiving also recombining the reflected components into a composite beam;

means disposed in a path of the composite beam for extracting from each component thereof a portion of similar polarization so that these portions, as leaving the means for extracting, are permitted to, and do, interfere;

first detection means disposed for intercepting the interfering beam portions for photoelectrically detecting a distribution of radiation intensities of the two interfering beam portions, separately at different points in a plane;

second detection means disposed for bypassing the means for extracting, for detecting the intensity of each component of said composite beam and as it would be effective in each of said points but for the interference; and means connected to the first and second detection means, for deriving therefrom a distribution of optical path length differences of the two interfering beams.

2. Interferometer for measuring optical properties of a test object definable as local optical path length differences, such as the surface contour of a test mirror or the homogeneities of a medium, comprising:

means for producing a beam of monochromatic radiation having two components, having perpendicular polarization;

shutter means disposed for permitting only one or the other, or both, of the two components to pass;

means disposed for receiving the beam and separating the two components, or portions thereof, and having an orientation to direct one of the separated components into a test branch which includes the test object, the other one to a reference mirror, the test branch and the reference mirror reflecting the respective components, the means for receiving also recombining the reflected components into a composite beam and separately for each operational state of the shutter means;

means disposed in a path of the composite beam for extracting from each component thereof a portion of similar polarization so that these portions, as leaving the means for extracting, are permitted to, and do, interfere as long as the shutter means permits both components to pass;

means disposed in a plane, intercepting the composite beam for photoelectrically detecting a distribution of radiation intensities of the two beam portions, separately at different points in said plane and separately for each operational state of the shutter means; and means connected to the means for detecting, for deriving therefrom a distribution of optical path length differences of the two interfering beams.

3. Interferometer for measuring optical properties of a test object definable as local path length differences, such as the surface contour of a test mirror or the homogeneities of a medium, comprising:

means for producing a beam of monochomatic radiation having parallel rays, further having two components, having perpendicular polarization;

means disposed for receiving the beam of parallel rays and separating the two components, or portions thereof, and having an orientation to direct one of the separated components into a test branch which includes the test object, the other components into the reference branch which includes the reference object, and the means for receiving also recombining the retro reflected components into a composite beam;

means disposed in a path of the composite beam for extracting from each component thereof a portion of similar polarization so that these portions, as leaving the means for extracting, are permitted to, and do, interfere;

first detection means disposed in a plane, intercepting the interfering beam portions for photoelectrically detecting a distribution of radiation intensities of the two interfering beam portions, separately in different points in said plane;

second detection means disposed for detecting the intensities of the components of the composite beam individually and on a corresponding point-by-point basis to obtain two amplitude values for each such point, in addition to the intensity as detected by the first detector means for such point; and means connected to the first and second detection means for deriving therefrom a point-by-point distribution of opotical path length differences of the two interfering beams.

4. Interferometer as in claim 3, the means included in the second detection means being disposed to intercept branched-off components of the composite beam.

* * * * *